United States Patent [19]

Yasumatsu et al.

[11] Patent Number: 4,610,464

[45] Date of Patent: Sep. 9, 1986

[54] SHOULDERBELT ANCHOR DEVICE

[75] Inventors: Jun Yasumatsu; Masanao Motonami; Makoto Yamada, all of Toyota, Japan

[73] Assignee: Toyota Jidosha Kabushiki Kaisha, Aichi, Japan

[21] Appl. No.: 679,103

[22] Filed: Dec. 7, 1984

Related U.S. Application Data

[63] Continuation of Ser. No. 423,298, Sep. 24, 1982, abandoned.

[30] Foreign Application Priority Data

Aug. 11, 1982 [JP] Japan .............................. 57-139349

[51] Int. Cl.[4] ........................................... B60R 21/10
[52] U.S. Cl. ...................................... 280/808; 70/100
[58] Field of Search .................... 280/801, 804, 808; 70/99, 100, DIG. 11

[56] References Cited

U.S. PATENT DOCUMENTS

| | | | |
|---|---|---|---|
| 3,163,033 | 12/1964 | Boyles | 70/100 |
| 3,964,798 | 6/1976 | Burleigh | 280/808 |
| 4,182,144 | 1/1980 | Leivenzon et al. | 70/100 |
| 4,398,749 | 8/1983 | Hipp et al. | 280/801 |
| 4,398,751 | 8/1983 | Wahlmann et al. | 280/808 |

FOREIGN PATENT DOCUMENTS

| | | | |
|---|---|---|---|
| 0049572 | 4/1982 | European Pat. Off. | |
| 2,344,287 | 3/1975 | Fed. Rep. of Germany | 280/808 |
| 3005818 | 2/1980 | Fed. Rep. of Germany | |
| 2362641 | 3/1978 | France | 280/808 |

*Primary Examiner*—John J. Love
*Assistant Examiner*—Ross Weaver
*Attorney, Agent, or Firm*—Parkhurst & Oliff

[57] ABSTRACT

An occupant restraining webbing is engaged with a sliding anchor, which is movable along a guide rail solidly secured to a vehicle body. Lock bars provided on the sliding anchor are received in engaging holes formed in the guide rail therealong, whereby the sliding anchor is positively supported on a side wall of the vehicle body to secure an occupant in a restrained state in an emergency situation of a vehicle. While, the occupant can withdraw the lock bars from the engaging holes and move the sliding anchor, so that an anchor point can be adjusted.

9 Claims, 7 Drawing Figures

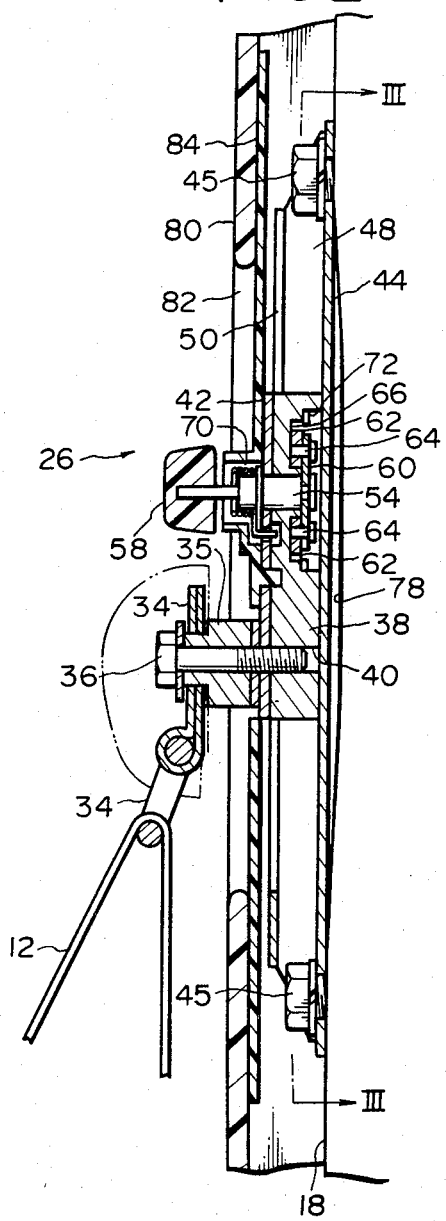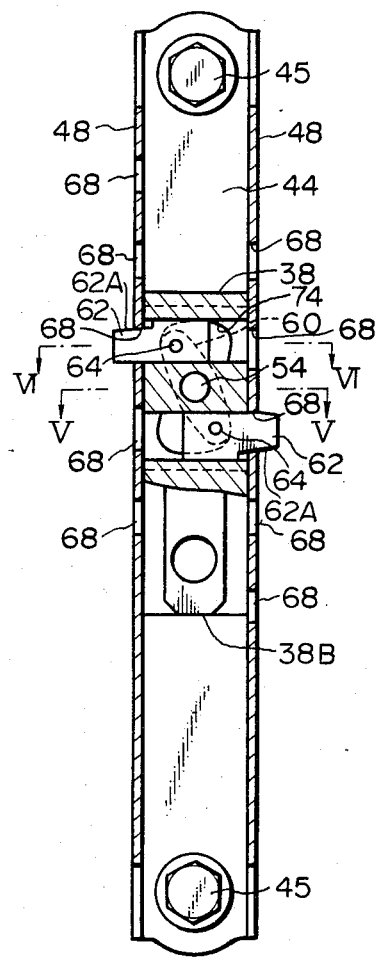

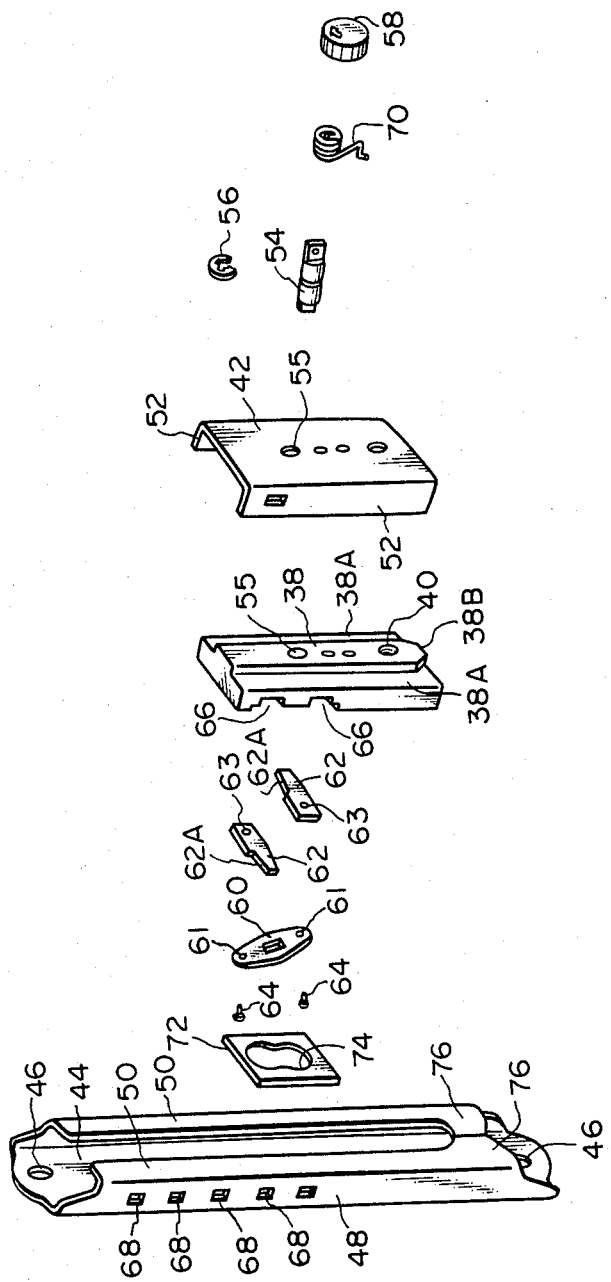

SHOULDERBELT ANCHOR DEVICE

This is a Continuation of application Ser. No. 423,298 filed Sept. 24, 1982, now abandoned.

BACKGROUND OF THE INVENTION

1. Field of the Invention

This invention relates to a shoulder belt anchor device used in a seatbelt system for restraining an occupant in an emergency situation of a vehicle, for engaging a shoulder webbing with a side wall of a vehicle body, and more particularly to a shoulder belt anchor device capable of moving a position of engagement.

2. Description of the Prior Art

Among various seatbelt systems, there is one having a shoulder webbing for obliquely restraining a shoulder of an occupant. In this seatbelt system, one end of this shoulder webbing is engaged with a vehicle body through an anchor device. With this anchor device, in order to reliably support a tension in the shoulder webbing generated by an inertial force of the occupant in an emergency situation of the vehicle to a side wall of a vehicle body, it is necessary to make this anchor device strong. From this reason, heretofore, an anchor plate for engaging one end portion of the shoulder webbing has been positively tightened to the side wall of the vehicle body.

However, this anchor device constitutes an anchor point which is an engaging portion of the shoulder webbing with the vehicle body, and this anchor point is a factor for determining a position of contact at the shoulder of the occupant. In consequence, this anchor point is determined such that a Proper webbing-fastened position is rendered to an occupant having an average physical build. However, the physical builds of the occupants are quite different from one occupant to another, from man to woman, and the position of the shoulder webbing being in contact with the occupant varies depending upon the driving posture of the occupant and changes in seat position.

SUMMARY OF THE INVENTION

The present invention has been developed in view of the above-described facts and has as its object the provision of shoulder belt anchor device capable of adjusting a webbing pass, meeting the position of shoulder of the occupant, even when an occupant having any physical build entered the vehicle or even when the occupant changes his seat position to anywhere.

In the shoulder belt anchor device according to the present invention, a guide rail is solidly secured to a side wall of a vehicle body, a sliding anchor is made to be vertically movable along this guide rail, this sliding anchor is made to stop at a plurality of positions relative to the guide rail by lock means, and a mounted position of the sliding anchor is changed so as to make a shoulder anchor secured to the sliding anchor to be adjustable in position.

Description will hereunder be given of an embodiment of the present invention with reference to the drawings.

BRIEF DESCRIPTION OF THE DRAWINGS

FIG. 2 is a sectional view taken along the line II—II in FIG. 1;

FIG. 3 is a sectional view taken along the line III—III in FIG. 2;

FIG. 7 is a disassembled perspective view showing the guide rail and the sliding anchor.

DESCRIPTION OF THE PREFERRED EMBODIMENT

Figure 1:
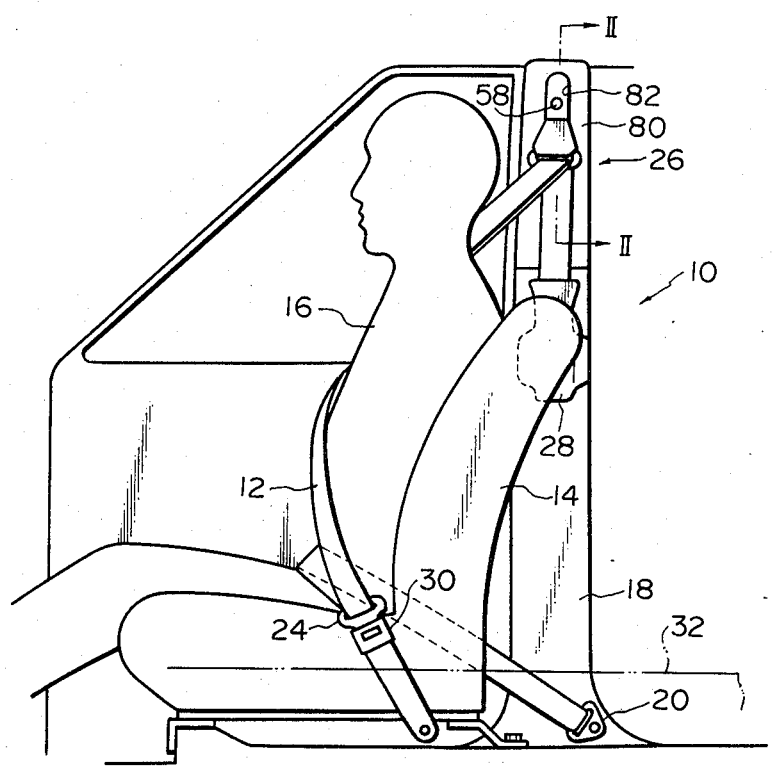
FIG. 1 is a side view showing the seatbelt system, to which the shoulder belt anchor device according to the present invention is applied, in looking from a side of the vehicle.

FIG. 1 shows a seatbelt system 10, to which the shoulder belt anchor device according to the present invention is applied. In this seatbelt system 10, an occupant 16 seated on a seat 14 is restrained by a webbing 12.

This webbing 12 is engaged at one end thereof with a lap anchor plate 20 solidly secured to a side wall 18 of a vehicle body, and has the intermediate portion thereof turned back at a tongue plate 24 and a shoulder belt anchor device 26, and thereafter, wound into a retractor 28. This retractor 28, being solidly secured to the side wall 18 of the vehicle body, is adapted to retract the webbing 12 by its biasing force, and incorporates therein an inertia lock mechanism for instantaneously stop the withdrawal of the webbing 12 in an emergency situation of the vehicle.

Additionally, the tongue plate 24 is engageable with a buckle device 30, which is erected from a tunnel portion 32 formed on a floor portion disposed substantially in the center of the vehicle.

Detailed description will now be given of the shoulder belt anchor device 26 in conjunction with FIGS. 2 through 7. In this shoulder belt anchor device 26, the shoulder anchor 34, at which the intermediate portion of the webbing 12 is turned back, is rotatably supported by a cylinder 35, which is solidly secured to an anchor block 38 through a bolt 36. A portion of the webbing 12 between this shoulder anchor 34 and the tongue plate 24 (Refer to FIG. 1) functions as the shoulder webbing.

The anchor block 38 is made of metal, penetratingly provided therein with an internally threaded portion 40 threadably coupled to the bolt 36, and a reinforcing plate 42 is adapted to be clamped between this anchor block 38 and the shoulder anchor 34 when the bolt 36 is tightened. In cooperation with the shoulder anchor 34, this reinforcing plate 42 and the anchor block 38 function as a sliding anchor, which is movable along a guide rail 44.

Figure 4:
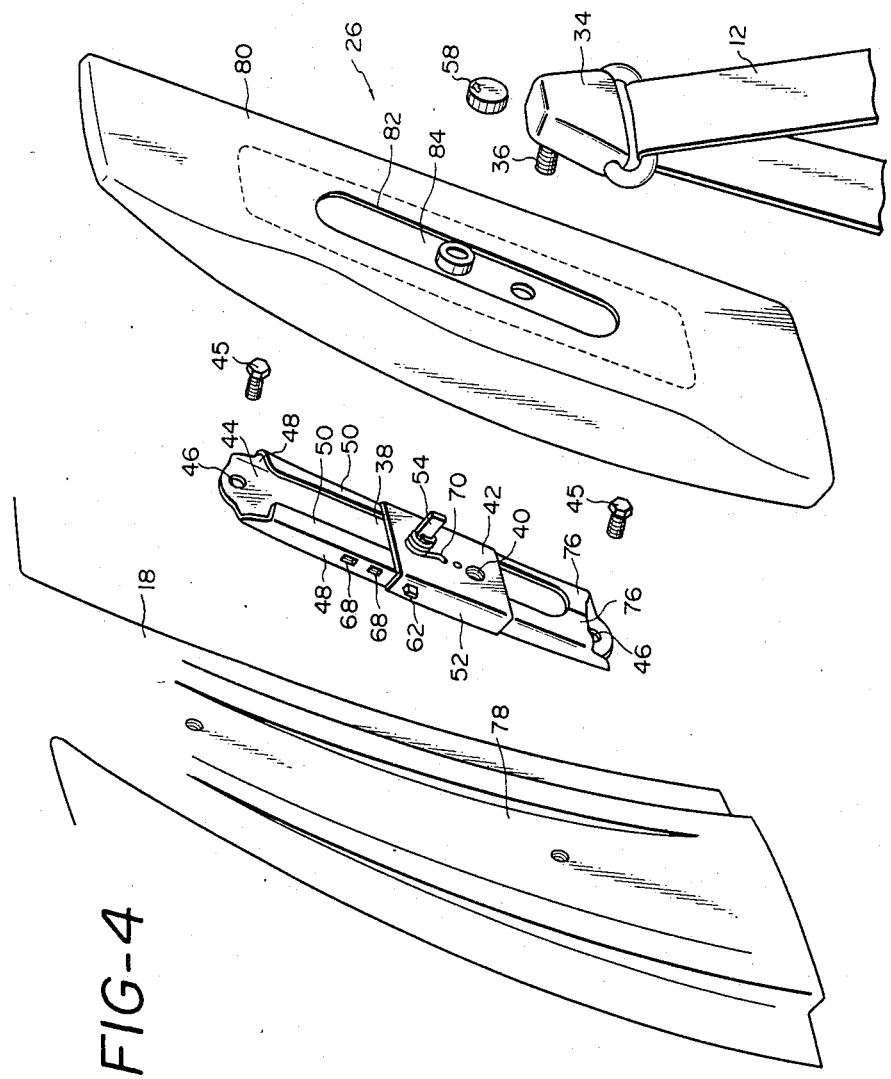
FIG. 4 is a disassembled perspective view showing part of FIG. 1.
Figure 5:
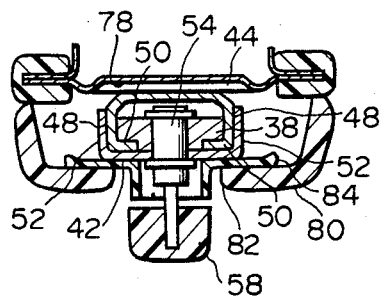
FIG. 5 is a sectional view taken along the line V—V in FIG. 3.
Figure 6:
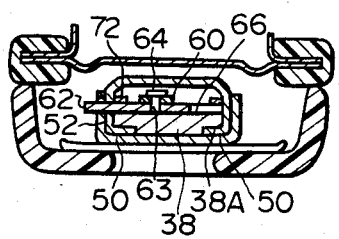
FIG. 6 is a sectional view taken along the line VI—VI in FIG. 3.

As apparently shown in FIG. 7, the guide rail 44 is formed of a plate material, and formed at top and bottom end portions thereof with round holes 46, through which the guide rail 44 is to be solidly secured to the side wall 18 of the vehicle body by means of bolts 45 as shown in FIGS. 2 through 4. A pair of side plates 48, being bent at right angles, are projected into a compartment in parallel to each other from the intermediate portion of the guide rail 44 in the vertical direction. These side plates 48 are adapted to clamp opposite side portions of the anchor block 38 to prevent the anchor block 38 from moving in the longitudinal direction of the vehicle.

Leg plates 50, being bent at right angles, are further extended from forward end portions of the side plates 48 into the compartment in a manner to approach each other. These leg plates 50 are opposed to a cutaway stepped portion 38A formed on the surface of the anchor block 38 directed into the compartment so as to prevent the anchor block 38 from moving into the compartment, so that the anchor block 38 can reliably impart the webbing tension to the side wall 18 of the vehicle body.

Side plates 52, being bent at right angles, are extended from opposite end portions of the reinforcing plate 42 solidly secured to the anchor block 38 and opposed to the outer surfaces of the side plates 48 of the guide rail 44 (Refer to FIGS. 5 and 6) whereby the side plates 48 and the leg plates 50 of the side rail 44 are prevented from being deformed, to thereby be improved in mechanical strength.

Round holes 55 are penetrated through the anchor block 38 and the reinforcing plate 42, respectively, to receive therethrough a shaft 54 as being a releasing device. This shaft 54 is determined in its amount of insertion into the anchor block 38 by a ring 56, and rotatable about its axis. Additionally, a knob 58 is solidly secured to the forward end portion of the shaft 54 directed into the compartment, projects into the compartment, and the occupant can rotate this knob 58.

A lock plate 60 is affixed at the central portion thereof to an end portion of the shaft 54 opposite to the knob 58. This lock plate 60 functions to prevent the shaft 54 from being dislodged into the compartment, and further, functions to impart the rotation of the shaft 54 to a pair of lock bars 62.

More specifically, respective ends of these lock bars 62 are connected to opposite ends of the lock plate 60 through pins 64, and received in a slide groove 66 formed on the surface of the anchor block 38 on the outboard side and in the horizontal direction. In consequence, rotation of the shaft 54 causes the pair of lock bars 62 to move in directions opposite to each other, whereby a turning force of the shaft 54 is imparted to the lock bars 62 as horizontally, linearly moving forces of the lock bars 62 in the slide groove 66. From this reason, the round holes 61 of the lock plate 60 for receiving the pins 64 or the round holes 63 of the lock bars 62 are formed into slots. Additionally, the sliding direction of the lock plate 60 is perpendicular to the sliding direction of the anchor block 38 (vertical direction).

The forward end portions of these lock bars 62 are opposed to a plurality of engaging holes 68 formed in the side plates 48 of the guide rail 44. These engaging holes 68 are rectangular through-holes penetrated through the side plates 48 disposed at regular intervals, arranged in the vertical direction and in plural number (five holes in this embodiment). Here, the lock bars 62 are adapted to be biased in directions of being inserted into and engaged with the engaging holes 68. More specifically, a torsion coil spring 70 is confined between the shaft 54 and the reinforcing plate 42 to render a turning force to the shaft 54, and this turning force causes the forward end portions of the lock bars 62 to be inserted into the engaging holes 68, whereby the anchor block 38 is prevented from moving vertically. However, when the shaft 54 is rotated against the biasing force of this torsion coil spring 70, the lock bars 62 are withdrawn from the engaging holes 68, so that the anchor block 38 can move along the guide rail 44.

In addition, an amount of rotation of the lock plate 60 is controlled by a size of a slot 74 penetrated in a plate 72 solidly secured to the anchor block 38. Furthermore, the amount of rotation of the lock plate 60 in a direction of locking is controlled by the engagement of the tapered portions 62A of the lock bars 62 with the engaging holes 68 of the guide rail 44.

As shown in FIG. 7, the leg plates 50 of the guide rail 44 are partially formed thereon with projections 76, respectively, which are connected to each other to form the cross-section of the guide rail 44 into a loop-shaped closed cross-section, brought into abutment with the bottom end 38B of the anchor block 38 to control the movement amount of the anchor block 38 and improve the guide rail 44 in mechanical strength as well.

As shown in FIG. 4, a recess 78 is formed on the surface of the inboard side of the side wall 48 (center pillar) of the vehicle body, to which the guide rail 44 is solidly secured, and there is formed a gap between the aforesaid surface and the vertically intermediate portion of the guide rail 44, whereby, when the guide rail 44 is solidly secured to the side wall 18 of the vehicle body, such a disadvantage can be obviated that the guide rail 44 is bent due to the tolerance limits of production and the like, and further, the value of projection of this shoulder anchor device into the compartment can be minimized.

A center pillar garnish 80 is secured to this side wall 18 of the vehicle body after the guide rail 44 has been affixed thereto, to thereby cover the outer surface of the guide rail 44. A slot 82 for allowing the bolt 36 and the shaft 54 to pass therethrough is penetrated in this center pillar garnish 80 in the vertical direction, and a sliding garnish 84 is provided between the reinforcing plate 42 and this center pillar garnish 80 and vertically movable along with the anchor block 38. By this, the sliding garnish 84 covers an unnecessary portion of the slot 82.

Description will now be given of action of the present embodiment with the above-described embodiment. When the occupant 16 engages the tongue plate 24 with the buckle device 30 upon being seated on the seat 14, a three-point seatbelt system is fastened about him through the webbing 12 as shown in FIG. 1. More specifically, a portion of the webbing between the lap anchor plate 20 and the tongue plate 24 is fastened about the occupant as a lap webbing, and a portion of the webbing between the tongue plate 24 and the shoulder belt anchor device 26 as a shoulder webbing.

When the occupant 16 has adjusted the mounted position of the seat 14 or the occupant 16 having a different physical build has entered the vehicle, the shoulder belt anchor device 26, which is the position of the shoulder webbing mounted to the wide wall of the vehicle body, should be adjusted in position depending on the position of shoulder of the occupant. In this case, the occupant turns the knob 58 to rotate the shaft 54 against the biasing force of the torsion coil spring 70, the pair of lock bars 62 are withdrawn from the engaging holes 68.

With the above-described operation, the anchor block 38 is made rotatable in the vertical direction along the guide rail 44, and, upon moving the shoulder anchor 34 to a desired position, the anchor block 38 releases the knob 58. As the result, the lock bars 62 enter any of the engaging holes 68 again by the biasing force of the torsion coil spring 70, to thereby stop the movement of the anchor block 38.

When the lock bars 62 are arranged symmetrically with respect to the center of the shaft 54, even if an acceleration in any direction is applied, angular moments of the shaft 54 acting on the masses of the lock bars 62 due to the acceleration are offset, whereby no action of rotating the shaft 54 occurs, so that no particularly strong torsion coil spring for outwardly biasing the lock bars 62 is required, thus enabling to offer an advantage of reliably maintaining the locking positions of the lock bars 62.

As described above, the occupant can change the position of the anchor point through a simple operation, so that a webbing-fastened condition meeting the shoulder position of the occupant can be obtained at all times.

In an emergency situation of the vehicle, the inertia lock mechanism in the retractor 28 instantaneously stops the unwinding of the webbing 12, and the occupant 16 is moved in a direction of a collision under an inertial force, whereby a tension of a high value occurs in the webbing 12. This tension is imparted to the anchor block 38 via the shoulder anchor 34.

However, this anchor block 38 is reliably supported by the side wall 18 of the vehicle body through the guide rail 44 because the lock bars 62 are positively engaged with the engaging holes 18 of the guide rail 44, whereby the occupant 16 is maintained in a restrained state by the webbing 12, thereby enabling to secure the occupant in safety. Particularly, the anchor block 38, being surrounded by the side plates 48 and the leg plates 50 of the guide rail 44 and the reinforcing plate 42 prevetns the guide rail 44 from being deformed, has a rugged construction.

As has been described hereinabove, in the shoulder belt anchor device according to the present invention, the guide rail is solidly secured to the vehicle body, and the sliding anchor vertically movable along this guide rail is locked against the guide rail by the lock means, whereby the shoulder anchor is positively secured to the side wall of the vehicle body, so that the sliding anchor can move vertically along the guide rail. Hence, the shoulder belt anchor device according to the present invention can offer the advantage that the occupant can readily arrange the anchor point at a proper position.

What is claimed is:

1. A shoulder belt anchor device for securing an occupant's shoulder restraining webbing to a vehicle body, comprising:
    a guide rail secured to a side wall of the vehicle body, said guide rail having a longitudinal axis and side walls along its longitudinal direction;
    a sliding anchor having an anchor blook and being movable along said guide rail in its longitudinal direction, said sliding anchor being secured with a shoulder anchor engaged with said webbing, the anchor block having a first layer and a second layer, an opening being provided in one of said first and second layers;
    a lock member rotatably positioned within said opening, said lock member being substantially coplanar with said one of said first and second layers;
    lock means for anchoring said sliding anchor at a selected position along said guide rail, said lock means including a pair of lock bars pivotally connected to said lock member and a plurality of engaging holes formed in the side walls of said guide rail in the longitudinal direction thereof, said guide rail being capable of receiving said lock bars through said engaging holes so that said sliding anchor is prevented from moving when said lock bars are engaged with said engaging holes;
    guide means for guiding said lock bars in directions opposite to each other, said guide means including passages formed in the layer of said anchor block opposite from the layer in which said opening is located;
    biasing means for biasing said lock member to urge said lock bars through said guide means in a direction of said engaging holes; and
    releasing means secured to said lock member for withdrawing the lock bars from said engaging holes against the biasing force of the biasing means, whereby said sliding anchor is moved along said guide rail to provide an adjustable anchor point for the webbing.

2. The shoulder belt anchor device as set forth in claim 1 wherein an engaging hole in one side wall of the guide rail is substantially aligned with an engaging hole in the other side wall and the lock bars engage in non-aligned holes in the side walls.

3. The shoulder belt anchor device as set forth in claim 1 wherein the lock bars are longitudinally spaced from each other.

4. The shoulder belt device as set forth in claim 1 wherein the opering has a stopping face defining a rotatable range for rotating the lock mmember.

5. The shoulder belt anchor device as set forth in claim 1 wherein the anchor block of the sliding anchor is secured to a reinforcing plate arranged outside of the guide rail and provided with side plates extending therefrom for clamping the side walls of the guide rail between the side plates and the anchor block, and through holes for the lock bars are located in the side plates of the reinforcing plate.

6. The shoulder belt anchor device as set forth in claim 1, wherein the releasing means includes a shaft secured to said lock member, said shaft and said lock member being rotatable relative to the sliding anchor, rotation of the shaft slidably moving said lock bars.

7. The shoulder belt anchor device as set forth in claim 6, wherein the lock bars are symmetrically positioned with respect to the center of the shaft so that the lock bars are not withdrawn from the engaging holes by a force applied in any direction.

8. The shoulder belt anchor device as set forth in claim 1, wherein a portion of the side walls of the guide rail are partially connected to each other and the cross-section of the portion of the guide rail is formed into a loop-shaped closed cross-section.

9. A shoulder belt anchor device for securing an occupant's shoulder restraining webbing to a vehicle body, comprising:
    a guide rail secured to a side wall of the vehicle body, said guide rail having a longitudinal axis and side walls along its longitudinal direction;
    a sliding anchor having an anchor block and being movable along said guide rail in its longitudinal direction, said sliding anchor being secured with a shoulder anchor engaged with said webbing, the anchor block having a first layer and a second layer, an opening being provided in one of said first and second layers, the anchor block being secured to a reinforcing plate arranged outside of the guide rail and provided with side plates extending therefrom for clamping the side walls of the guide rail between the side plates and the anchor block;
    a lock member rotatably positioned within said opening;
    lock means for anchoring said sliding anchor at a selected position along said guide rail, said lock means including a pair of lock bars pivotally connected to said lock member and a plurality of engaging holes formed in the side walls of said guide rail in the longitudinal direction thereof, said guide rail being capable of receiving said lock bars through said engaging holes so that said sliding anchor is prevented from moving when said lock bars are engaged with said engaging holes, the side plates of the reinforcing plate including through holes for the lock bars;

guide means for guiding said lock bars in directions opposite to each other, said guide means including passages formed in the layer of said anchor block opposite from the layer in which said opening is located;

biasing means for biasing said lock member to urge said lock bars through said guide means in a direction of said engaging holes; and releasing means secured to said lock member for withdrawing the lock bars from said engaging holes against the biasing force of the biasing means, whereby said sliding anchor is moved along said guide rail to provide an adjustable anchor point for the webbing.

* * * * *